UNITED STATES PATENT OFFICE.

JAMES HENDERSON, OF BELLEFONTE, PENNSYLVANIA.

COMPOUND FOR FURNACE-LININGS AND FIRE-BRICK.

SPECIFICATION forming part of Letters Patent No. 279,157, dated June 12, 1883.

Application filed October 9, 1882. (No specimens.)

*To all whom it may concern:*

Be it known that I, JAMES HENDERSON, of Bellefonte, county of Centre, State of Pennsylvania, have invented a new and useful Improvement in Compounds for Furnace-Linings and Fire-Brick, of which the following is such clear, and exact description as will enable full, others skilled in the art to which it most nearly appertains to make and use the same.

The object of this invention is the making of a compound for furnace-linings and fire-brick for furnaces, converters, and other metallurgic vessels of oxide of iron in a pulverized or powdered condition with a mixture of water and glucose or other vegetable substance from which starch or sugar may be extracted, so as to bind or hold the oxide of iron together into a mass.

In carrying out my invention I prefer to use the pure iron sands of Long Island, New York, and that ore found on the seashore of some other places, or the purer kinds of iron ores from Lake Superior or Lake Champlain, or some oxide of iron practically free from impurities. The oxide of iron is reduced to a fine sand, or preferably ground to a fine flour, so as to pass through a sieve having three thousand six hundred meshes to the square inch. The water is mixed with glucose in about the proportion of one to one and one-half part water to one part glucose. Instead of glucose, I may use dextrine, starch, gum-arabic, molasses, or like substances from which sugar or starch may be extracted, and dissolved then in the water. Wheat, rye, rice, or other grain flour, pea, bean, or oat meal, wood-pulp, cellulose, or other like vegetable substance from which sugar or starch may be extracted in a finely-divided state may be added to the water and mixed with it to a thin paste, or so that the finely-divided substances are held in suspension. The water so impregnated with a vegetable substance from which sugar or starch may be extracted is mixed with the finely-divided oxide of iron, so as to form a thick mortar. The proportion of vegetable substance to the water should be such that when dried, after being mixed with the fine oxide of iron, it will bind the oxide of iron together firmly.

The compound or mortar thus made may be used as a lining applied wet—that is, as a mortar—to the inside of a furnace, converter, or other metallurgic vessel, and may be thus applied on the outside or over the basic or silicious lining, and protects the lining during the desiliconization of the metal; or the compound may be made into brick and used in that form for like purposes. Whether used as a mortar or as a brick, when dried in the atmosphere at the ordinary temperature this compound is ready for use.

Linings and brick made of this compound are adapted for lining furnaces in which crude iron is puddled or purified, and the temperature is about as high as puddling-furnaces. A portion of the lining becomes incorporated into the charge at those temperatures.

I am aware that oxide of iron in pieces has been heretofore used as a lining for furnaces; but it is difficult to apply a lining made of lumps of oxide of iron.

Oxide of iron in a finely-divided state mixed with lime or similar material and water, with glucose or a vegetable substance from which starch or sugar may be extracted, are claimed by me in Patents No. 265,068 and 265,069, of September 26, 1882.

What I do claim, and desire to secure by Letters Patent, is—

1. The compound for furnace-linings and fire-brick, consisting of oxide of iron in a finely-divided state, a vegetable substance from which starch or sugar may be extracted, and water, as specified and set forth.

2. The compound for furnace-linings and fire-brick, consisting of oxide of iron in a finely-divided state, glucose, and water, as specified and set forth.

JAMES HENDERSON.

Witnesses:
E. M. BLANCHARD,
J. IRWIN HAGERMAN.